(12) United States Patent
Omekanda et al.

(10) Patent No.: US 10,480,674 B2
(45) Date of Patent: Nov. 19, 2019

(54) ELECTROMAGNETIC ACTUATOR STRUCTURE

(71) Applicant: GM GLOBAL TECHNOLOGY OPERATIONS LLC, Detroit, MI (US)

(72) Inventors: Avoki M. Omekanda, Rochester, MI (US); Thomas W. Nehl, Shelby Township, MI (US); Chandra S. Namuduri, Troy, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/127,015

(22) PCT Filed: Mar. 19, 2015

(86) PCT No.: PCT/US2015/021386
§ 371 (c)(1),
(2) Date: Sep. 17, 2016

(87) PCT Pub. No.: WO2015/143107
PCT Pub. Date: Sep. 24, 2015

(65) Prior Publication Data
US 2017/0284556 A1    Oct. 5, 2017

Related U.S. Application Data

(60) Provisional application No. 61/968,067, filed on Mar. 20, 2014.

(51) Int. Cl.
*H01F 3/00* (2006.01)
*F16K 31/06* (2006.01)
(Continued)

(52) U.S. Cl.
CPC ......... *F16K 31/0675* (2013.01); *H01F 7/081* (2013.01); *H01F 27/24* (2013.01); *H01F 2007/086* (2013.01)

(58) Field of Classification Search
CPC ............. F16K 31/06; H01F 27/24; H01F 7/08
(Continued)

(56) References Cited

U.S. PATENT DOCUMENTS 4,746,887 A * 5/1988 Nogata ................. H01F 7/1607
335/261
5,381,297 A    1/1995 Weber
(Continued)

FOREIGN PATENT DOCUMENTS

CN        1860658 A    11/2006
DE     34 37 053 C2    6/1985
(Continued)

OTHER PUBLICATIONS

A. M. Pawlak, Transient Finite Element Modeling of Solenoid Actuators, IEEE Transactions on Magnetics, Jan. 1988, 270-273, vol. 24, No. 1.
(Continued)

*Primary Examiner* — Shawki S Ismail
*Assistant Examiner* — Lisa N Homza
(74) *Attorney, Agent, or Firm* — Cantor Colburn LLP

(57) ABSTRACT

A core structure for an electromagnetic actuator includes an electrically conductive magnetic core component having a magnetic axis, an outer surface between axially opposite ends and at least one slit arranged between said axially opposite ends through the outer surface.

14 Claims, 7 Drawing Sheets

(51) Int. Cl.
*H01F 7/08* (2006.01)
*H01F 27/24* (2006.01)

(58) Field of Classification Search
USPC .......................................................... 335/281
See application file for complete search history.

(56) References Cited

U.S. PATENT DOCUMENTS

| | | | |
|---|---|---|---|
| 5,823,165 A * | 10/1998 | Sato | ............... F02D 11/10 |
| | | | 123/399 |
| 5,831,809 A | 11/1998 | Schmitz | |
| 6,168,135 B1 | 1/2001 | Fochtman | |
| 6,321,700 B1 | 11/2001 | Hein | |
| 2002/0148442 A1 | 10/2002 | Fraenkle | |
| 2003/0184946 A1 | 10/2003 | Kolmanovsky | |
| 2007/0056784 A1 | 3/2007 | Joe | |
| 2007/0120332 A1 | 5/2007 | Bushko | |
| 2007/0285195 A1 | 12/2007 | Nehl | |
| 2008/0204178 A1 | 8/2008 | Maranville | |
| 2009/0317691 A1 * | 12/2009 | Yamada | ................ F04F 5/18 |
| | | | 429/444 |
| 2010/0018503 A1 | 1/2010 | Perry | |
| 2010/0286791 A1 * | 11/2010 | Goldsmith | ....... A61B 17/12022 |
| | | | 623/23.7 |
| 2011/0048381 A1 * | 3/2011 | McAlister | ......... F02M 51/0671 |
| | | | 123/472 |
| 2011/0100775 A1 * | 5/2011 | Foister | ................. F16F 9/535 |
| | | | 188/267.2 |
| 2011/0125391 A1 | 5/2011 | McAlister | |
| 2012/0018262 A1 | 1/2012 | Winkler | |
| 2012/0101707 A1 | 4/2012 | Kemmer | |
| 2012/0239278 A1 | 9/2012 | Becker | |
| 2012/0247428 A1 | 10/2012 | Grimminger | |
| 2013/0113407 A1 | 5/2013 | Neelakantan | |
| 2013/0133748 A1 | 5/2013 | Lehner | |
| 2014/0069533 A1 | 3/2014 | Gorzen | |
| 2014/0092516 A1 | 4/2014 | Koch | |
| 2014/0110508 A1 | 4/2014 | Dames | |
| 2015/0123662 A1 | 5/2015 | Yasui | |
| 2015/0267660 A1 | 9/2015 | Nehl | |
| 2015/0267661 A1 | 9/2015 | Namuduri | |
| 2015/0267662 A1 | 9/2015 | Nehl | |
| 2015/0267663 A1 | 9/2015 | Namuduri | |
| 2015/0267666 A1 | 9/2015 | Gopalakrishnan | |
| 2015/0267667 A1 | 9/2015 | Namuduri | |
| 2015/0267668 A1 | 9/2015 | Gopalakrishnan | |
| 2015/0267669 A1 | 9/2015 | Nehl | |
| 2015/0267670 A1 | 9/2015 | Nehl | |
| 2015/0285175 A1 | 10/2015 | Parrish | |

FOREIGN PATENT DOCUMENTS

| | | |
|---|---|---|
| DE | 196 43 788 A1 | 5/1998 |
| DE | 199 21 938 A1 | 12/1999 |
| DE | 10 2007 053 877 B3 | 4/2009 |
| DE | 10 2011 083 007 A1 | 3/2013 |
| DE | 10 2012 208 781 B4 | 11/2013 |
| EP | 0 074 420 A1 | 3/1983 |
| EP | 1670005 A2 | 6/2006 |
| EP | 2148081 A1 | 1/2010 |
| EP | 2336544 A1 | 6/2011 |
| JP | 10-311265 A | 11/1998 |
| JP | 2007-270658 A | 10/2007 |
| KR | 10-2002-0094494 A | 12/2002 |
| WO | WO 90-02872 A1 | 3/1990 |
| WO | WO 87-01765 A1 | 3/1997 |
| WO | WO 2015 143107 A1 | 9/2015 |
| WO | WO 2015 143109 A1 | 9/2015 |
| WO | WO 2015 143116 A1 | 9/2015 |

OTHER PUBLICATIONS

T. W. Nehl, ANTIC85: A General Purpose Finite Element Package for Computer Aided Design, IEEE Transactions on Magnetics, Jan. 1988, 358-361, vol. 24, No. 1.

* cited by examiner

ELECTROMAGNETIC ACTUATOR STRUCTURE

TECHNICAL FIELD

This disclosure is related to solenoid-activated actuators.

BACKGROUND

The statements in this section merely provide background information related to the present disclosure. Accordingly, such statements are not intended to constitute an admission of prior art.

Solenoid actuators can be used to control fluids (liquids and gases), or for positioning or for control functions. A typical example of a solenoid actuator is the fuel injector. Fuel injectors are used to inject pressurized fuel into a manifold, an intake port, or directly into a combustion chamber of internal combustion engines. Known fuel injectors include electromagnetically-activated solenoid devices that overcome mechanical springs to open a valve located at a tip of the injector to permit fuel flow therethrough. Injector driver circuits control flow of electric current to the electromagnetically-activated solenoid devices to open and close the injectors. Injector driver circuits may operate in a peak-and-hold control configuration or a saturated switch configuration.

Fuel injectors are calibrated, with a calibration including an injector activation signal including an injector open-time, or injection duration, and a corresponding metered or delivered injected fuel mass operating at a predetermined or known fuel pressure. Injector operation may be characterized in terms of injected fuel mass per fuel injection event in relation to injection duration. Injector characterization includes metered fuel flow over a range between high flow rate associated with high-speed, high-load engine operation and low flow rate associated with engine idle conditions.

It is known for engine control to benefit from injecting a plurality of small injected fuel masses in rapid succession. Generally, when a dwell time between consecutive injection events is less than a dwell time threshold, injected fuel masses of subsequent fuel injection events often result in a larger delivered magnitude than what is desired even through equal injection durations are utilized. Accordingly, such subsequent fuel injection events can become unstable resulting in unacceptable repeatability. This undesirable occurrence is attributed to the existence of residual magnetic flux within the fuel injector that is produced by the preceding fuel injection event that offers some assistance to the immediately subsequent fuel injection event. The residual magnetic flux is produced in response to persistent eddy currents and magnetic hysteresis within the fuel injector as a result of shifting injected fuel mass rates that require different initial magnetic flux values. In addition to the undesirable production of residual magnetic flux, the persistent eddy currents delay armature response times resulting in unwanted deviations in the position of the armature during opening and closing events of the fuel injector, as well as unwanted bouncing effects of the armature after closing the fuel injector.

SUMMARY

A core structure for an electromagnetic actuator includes an electrically conductive magnetic core component having a magnetic axis, an outer surface between axially opposite ends and at least one slit arranged between said axially opposite ends through the outer surface.

BRIEF DESCRIPTION OF THE DRAWINGS

One or more embodiments will now be described, by way of example, with reference to the accompanying drawings, in which:

FIG. 4-1 illustrates a schematic sectional detailed view of a portion of the fuel injector of FIG. 1, in accordance with the present disclosure;

FIG. 4-2 illustrates a non-limiting exemplary embodiment of eddy current path(s) induced upon surfaces of conductive components within the magnetic flux path 421 of the fuel injector 10 of FIG. 4-1, in accordance with the present disclosure;

FIGS. 4-2A through 4-2D illustrate schematic end views of a variety of slit arrangements and combinations of slits in a magnetic component, in accordance with the present disclosure;

FIGS. 5-1, 5-2, 5-3, and 5-4 illustrate non-limiting exemplary embodiments of the conductive components of the fuel injector of FIGS. 4-1 and 4-2 having increased effective electrical resistivity in a direction of an eddy current path, in accordance with the present disclosure, in accordance with the present disclosure.

DETAILED DESCRIPTION

This disclosure describes the concepts of the presently claimed subject matter with respect to an exemplary application to linear motion fuel injectors. However, the claimed subject matter is more broadly applicable to any linear or non-linear electromagnetic actuator that employs an electrical coil for inducing a magnetic field within a magnetic core resulting in an attractive force acting upon a movable armature. Typical examples include fluid control solenoids, gasoline or diesel or CNG fuel injectors employed on internal combustion engines and non-fluid solenoid actuators for positioning and control.

Figure 1:
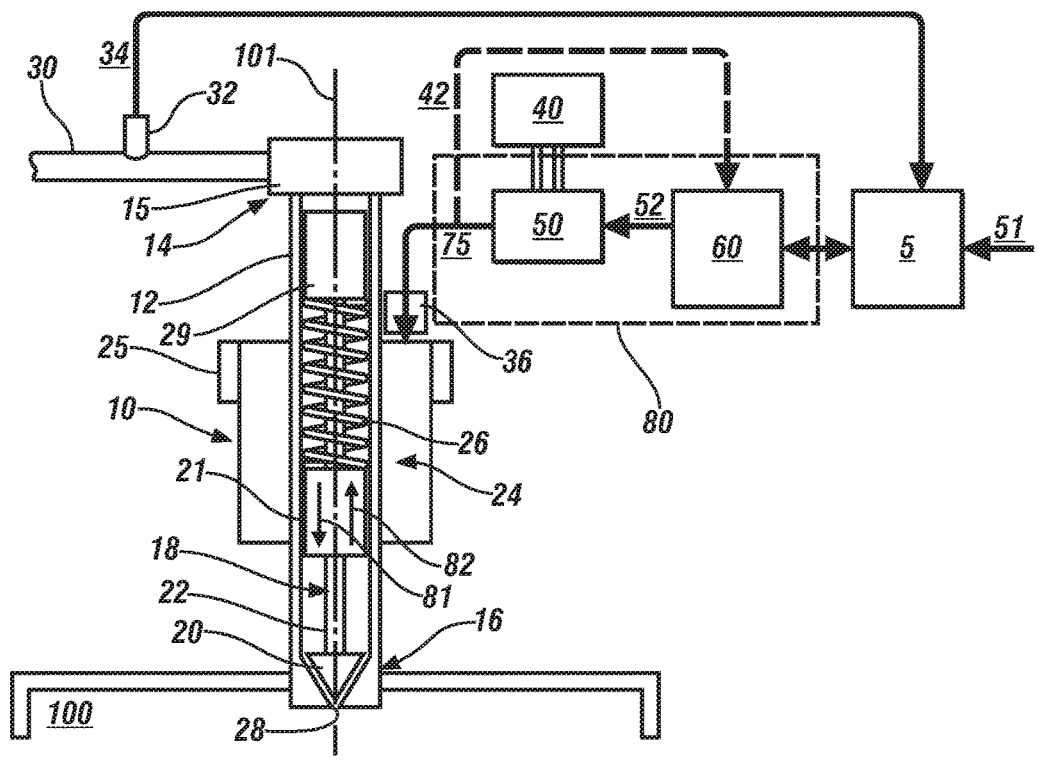
FIG. 1 illustrates a schematic sectional view of a fuel injector and an activation controller, in accordance with the present disclosure.

Referring now to the drawings, wherein the showings are for the purpose of illustrating certain exemplary embodiments only and not for the purpose of limiting the same, FIG. 1 schematically illustrates a non-limiting exemplary embodiment of an electromagnetically-activated direct-injection fuel injector 10. While an electromagnetically-activated direct-injection fuel injector is depicted in the illustrated embodiment, a port-injection fuel injector is equally applicable. The fuel injector 10 is configured to inject fuel directly into a combustion chamber 100 of an internal combustion engine. An activation controller 80 electrically operatively connects to the fuel injector 10 to control activation thereof. The activation controller 80 corresponds to only the fuel injector 10. In the illustrated embodiment, the activation controller 80 includes a control module 60 and an injector driver 50. The control module 60 electrically operatively connects to the injector driver 50 that electrically operatively connects to the fuel injector 10 to control activation thereof. Feedback signal(s) 42 may be provided from the fuel injector to the actuation controller 80.The fuel injector 10, control module 60 and injector driver 50 may be any suitable devices that are configured to operate as described herein. In the illustrated embodiment, the control module 60 includes a processing device. In one embodiment, one or more components of the activation controller 80 are integrated within a connection assembly 36 of the fuel injector 36. In another embodiment, one or more components of the activation controller 80 are integrated within a body 12 of the fuel injector 10. In even yet another embodiment, one or more components of the activation controller 80 are external to- and in close proximity with—the fuel injector 10 and electrically operatively connected to the connection assembly 36 via one or more cables and/or wires. The terms "cable" and "wire" will be used interchangeably herein to provide transmission of electrical power and/or transmission of electrical signals.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

In general, an armature is controllable to one of an actuated position and a static or rest position. The fuel injector 10 may be any suitable discrete fuel injection device that is controllable to one of an open (actuated) position and a closed (static or rest) position. In one embodiment, the fuel injector 10 includes a cylindrically-shaped hollow body 12 defining a longitudinal axis 101. A fuel inlet 15 is located at a first end 14 of the body 12 and a fuel nozzle 28 is located at a second end 16 of the body 12. The fuel inlet 15 is fluidly coupled to a high-pressure fuel line 30 that fluidly couples to a high-pressure injection pump. A valve assembly 18 is contained in the body 12, and includes a needle valve 20, a spring-activated pintle 22 and an armature portion 21. The needle valve 20 interferingly seats in the fuel nozzle 28 to control fuel flow therethrough. While the illustrated embodiment depicts a triangularly-shaped needle valve 20, other embodiments may utilize a ball. In one embodiment, the armature portion 21 is fixedly coupled to the pintle 22 and configured to linear translate as a unit with the pintle 22 and the needle valve 20 in first and second directions 81, 82, respectively. In another embodiment, the armature portion 21 may be slidably coupled to the pintle 22. For instance, the armature portion 21 may slide in the first direction 81 until being stopped by a pintle stop fixedly attached to the pintle 22. Likewise, the armature portion 21 may slide in the second direction 82 independent of the pintle 22 until contacting a pintle stop fixedly attached to the pintle 22. Upon contact with the pintle stop fixedly attached to the pintle 22, the force of the armature portion 21 causes the pintle 22 to be urged in the second direction 82 with the armature portion 21. The armature portion 21 may include protuberances to engage with various stops within the fuel injector 10.

An annular electromagnet assembly 24, including an electrical coil and magnetic core, is configured to magnetically engage the armature portion 21 of the valve assembly. The electrical coil and magnetic core assembly 24 is depicted for illustration purposes to be outside of the body of the fuel injector; however, embodiments herein are directed toward the electrical coil and magnetic core assembly 24 to be either integral to, or integrated within, the fuel injector 10. The electrical coil is wound onto the magnetic core, and includes terminals for receiving electrical current from the injector driver 50. Hereinafter, the "electrical coil and magnetic core assembly" will simply be referred to as an "electrical coil 24". When the electrical coil 24 is deactivated and de-energized, the spring 26 urges the valve assembly 18 including the needle valve 20 toward the fuel nozzle 28 in the first direction 81 to close the needle valve 20 and prevent fuel flow therethrough. When the electrical coil 24 is activated and energized, electromagnetic force (herein after "magnetic force") acts on the armature portion 21 to overcome the spring force exerted by the spring 26 and urges the valve assembly 18 in the second direction 82, moving the needle valve 20 away from the fuel nozzle 28 and permitting flow of pressurized fuel within the valve assembly 18 to flow through the fuel nozzle 28. A search coil 25 is mutually magnetically coupled to the electrical coil 24 and is preferably wound axially or radially adjacent coil 24. Search coil 25 is utilized as a sensing coil as described in further detail below.

The fuel injector 10 may include a stopper 29 that interacts with the valve assembly 18 to stop translation of the valve assembly 18 when it is urged to open. In one embodiment, a pressure sensor 32 is configured to obtain fuel pressure 34 in the high-pressure fuel line 30 proximal to the fuel injector 10, preferably upstream of the fuel injector 10. In another embodiment, a pressure sensor may be integrated within the inlet 15 of the fuel injector in lieu of the pressure sensor 32 in the fuel rail 30 or in combination with the pressure sensor. The fuel injector 10 in the illustrated embodiment of FIG. 1 is not limited to the spatial and geometric arrangement of the features described herein, and may include additional features and/or other spatial and geometric arrangements known in the art for operating the fuel injector 10 between open and closed positions for controlling the delivery of fuel to the engine 100.

The control module 60 generates an injector command (actuator command) signal 52 that controls the injector driver 50, which activates the fuel injector 10 to the open position for affecting a fuel injection event. In the illustrated embodiment, the control module 60 communicates with one or more external control modules such as an engine control module (ECM) 5; however, the control module 60 may be integral to the ECM in other embodiments. The injector command signal 52 correlates to a desired mass of fuel to be delivered by the fuel injector 10 during the fuel injection event. Similarly, the injector command signal 52 may correlate to a desired fuel flow rate to be delivered by the fuel injector 10 during the fuel injection event. As used herein, the term "desired injected fuel mass" refers to the desired mass of fuel to be delivered to the engine by the fuel injector 10. As used herein, the term "desired fuel flow rate" refers to the rate at which fuel is to be delivered to the engine by the fuel injector 10 for achieving the desired mass of fuel. The desired injected fuel mass can be based upon one or more monitored input parameters 51 input to the control module 60 or ECM 5. The one or more monitored input parameters 51 may include, but are not limited to, an operator torque request, manifold absolute pressure (MAP), engine speed, engine temperature, fuel temperature, and ambient temperature obtained by known methods. The injector driver 50 generates an injector activation (actuator activation) signal 75 in response to the injector command signal 52 to activate the fuel injector 10. The injector activation signal 75 controls current flow to the electrical coil 24 to generate electromagnetic force in response to the injector command signal 52. An electric power source 40 provides a source of DC electric power for the injector driver 50. In some embodiments, the DC electric power source 40 provides low voltage, e.g., 12 V, and a boost converter may be utilized to output a high voltage, e.g., 24V to 200 V, that is supplied to the injector driver 50. When activated using the injector activation signal 75, the electromagnetic force generated by the electrical coil 24 urges the armature portion 21 in the second direction 82. When the armature portion 21 is urged in the second direction 82, the valve assembly 18 in consequently caused to urge or translate in the second direction 82 to an open position, allowing pressurized fuel to flow therethrough. The injector driver 50 controls the injector activation signal 75 to the electrical coil 24 by any suitable method, including, e.g., pulsewidth-modulate (PWM) electric power flow. The injector driver 50 is configured to control activation of the fuel injector 10 by generating suitable injector activation signals 75. In embodiments that employ a plurality of successive fuel injection events for a given engine cycle, an injector activation signal 75 that is fixed for each of the fuel injection events within the engine cycle may be generated.

The injector activation signal 75 is characterized by an injection duration and a current waveform that includes an initial peak pull-in current and a secondary hold current. The initial peak pull-in current is characterized by a steady-state ramp up to achieve a peak current, which may be selected as described herein. The initial peak pull-in current generates electromagnetic force that acts on the armature portion 21 of the valve assembly 18 to overcome the spring force and urge the valve assembly 18 in the second direction 82 to the open position, initiating flow of pressurized fuel through the fuel nozzle 28. When the initial peak pull-in current is achieved, the injector driver 50 reduces the current in the electrical coil 24 to the secondary hold current. The secondary hold current is characterized by a somewhat steady-state current that is less than the initial peak pull-in current. The secondary hold current is a current level controlled by the injector driver 50 to maintain the valve assembly 18 in the open position to continue the flow of pressurized fuel through the fuel nozzle 28. The secondary hold current is preferably indicated by a minimum current level. The injector driver 50 is configured as a bi-directional current driver capable of providing a negative current flow for drawing current from the electrical coil 24. As used herein, the term "negative current flow" refers to the direction of the current flow for energizing the electrical coil to be reversed. Accordingly, the terms "negative current flow" and "reverse current flow" are used interchangeably herein.

Embodiments herein are directed toward controlling the fuel injector for a plurality of fuel injection events that are closely-spaced during an engine cycle. As used herein, the term "closely-spaced" refers to a dwell time between each consecutive fuel injection event being less than a predetermined dwell time threshold. As used herein, the term "dwell time" refers to a period of time between an end of injection for the first fuel injection event (actuator event) and a start of injection for a corresponding second fuel injection event (actuator event) of each consecutive pair of fuel injection events. The dwell time threshold can be selected to define a period of time such that dwell times less than the dwell time threshold are indicative of producing instability and/or deviations in the magnitude of injected fuel mass delivered for each of the fuel injection events. The instability and/or deviations in the magnitude of injected fuel mass may be responsive to a presence of secondary magnetic effects. The secondary magnetic effects include persistent eddy currents and magnetic hysteresis within the fuel injector and a residual flux based thereon. The persistent eddy currents and magnetic hysteresis are present due to transitions in initial flux values between the closely-spaced fuel injection events. Accordingly, the dwell time threshold is not defined by any fixed value, and selection thereof may be based upon, but not limited to, fuel temperature, fuel injector temperature, fuel injector type, fuel pressure and fuel properties such as fuel types and fuel blends. As used herein, the term "flux" refers to magnetic flux indicating the total magnetic field generated by the electrical coil 24 and passing through the armature portion. Since the turns of the electrical coil 24 link the magnetic flux in the magnetic core, this flux can therefore be equated from the flux linkage. The flux linkage is based upon the flux density passing through the armature portion, the surface area of the armature portion adjacent to the air gap and the number of turns of the coil 24. Accordingly, the terms "flux", "magnetic flux" and "flux linkage" will be used interchangeably herein unless otherwise stated.

For fuel injection events that are not closely spaced, a fixed current waveform independent of dwell time may be utilized for each fuel injection event because the first fuel injection event of a consecutive pair has little influence on the delivered injected fuel mass of the second fuel injection event of the consecutive pair. However, the first fuel injection event may be prone to influence the delivered injected fuel mass of the second fuel injection event, and/or further subsequent fuel injection events, when the first and second fuel injection events are closely-spaced and a fixed current wave form is utilized. Any time a fuel injection event is influenced by one or more preceding fuel injection events of an engine cycle, the respective delivered injected fuel mass of the corresponding fuel injection event can result in an unacceptable repeatability over the course of a plurality of engine cycles and the consecutive fuel injection events are considered closely-spaced. More generally, any consecutive actuator events wherein residual flux from the preceding actuator event affects performance of the subsequent actuator event relative to a standard, for example relative to performance in the absence of residual flux, are considered closely-spaced.

Figure 2:
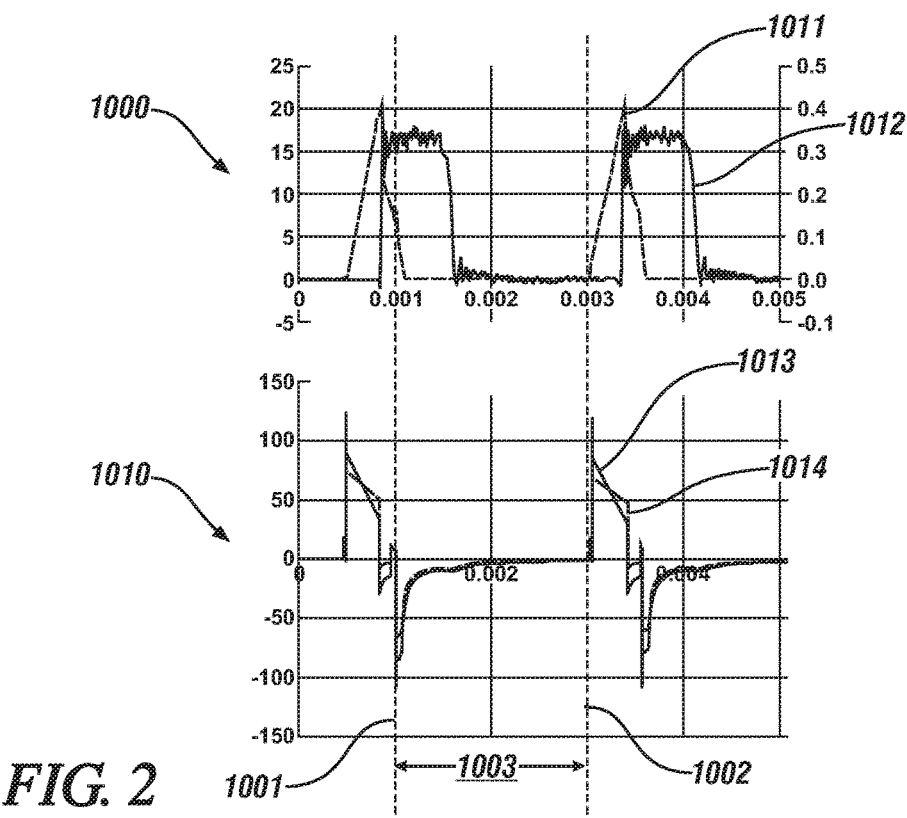
FIG. 2 illustrates a non-limiting exemplary first plot 1000 of measured current and fuel flow rate and a non-limiting exemplary second plot 1010 of measured main excitation coil and search coil voltages for two successive fuel injection events having identical current pulses that are separated by a dwell time that is not indicative of being closely spaced, in accordance with the present disclosure.

FIG. 2 illustrates a non-limiting exemplary first plot 1000 of measured current and fuel flow rate and a non-limiting exemplary second plot 1010 of measured main excitation coil and search coil voltages for two successive fuel injection events having identical current pulses that are separated by a dwell time that is not indicative of being closely spaced. Dashed vertical line 1001 extending through each of plots 1000 and 1010 represents a first time whereat an end of injection for the first fuel injection event occurs and dashed vertical line 1002 represents a second time whereat a start of injection for the second fuel injection event occurs. The dwell time 1003 represents a period of time between dashed vertical lines 1001 and 1002 separating the first and second fuel injection events. In the illustrated embodiment, the dwell time exceeds a dwell time threshold. Thus, the first and second fuel injection events are not indicative of being closely-spaced.

Referring to the first plot 1000, measured current and flow rate profiles 1011, 1012, respectively, are illustrated for the two fuel injection events. The vertical y-axis along the left side of plot 1000 denotes electrical current in Amperage (A) and the vertical y-axis along the right side of plot 1000 denotes fuel flow rate in milligrams (mg) per milliseconds (ms). The measured current profile 1011 is substantially identical for each of the fuel injection events. Likewise, the measured fuel flow rate profile 1012 is substantially identical for each of the fuel injection events due to the fuel injection events not indicative of being closely-spaced.

Referring to the second plot 1010, measured main excitation coil and search coil voltage profiles 1013, 1014, respectively, are illustrated for the two fuel injection events. The measured main coil voltage may represent a measured voltage of the electrical coil 24 of FIG. 1 and the measured search coil voltage may represent a measured voltage of a search coil mutually magnetically coupled to the electrical coil 24 of FIG. 1. The vertical y-axis of plot 1010 denotes voltage (V). Accordingly, when the main excitation coil is energized, magnetic flux generated by the main excitation coil may be linked to the search coil due to the mutual magnetic coupling. The measured search coil voltage profile 1014 indicates the voltage induced in the search coil which is proportional to the rate of change of the mutual flux-linkage. The measured main excitation coil and search coil voltage profiles 1013, 1014, respectively, of plot 1010 are substantially identical for each of the first and second fuel injection events that are not indicative of being closely-spaced.

Figure 3:
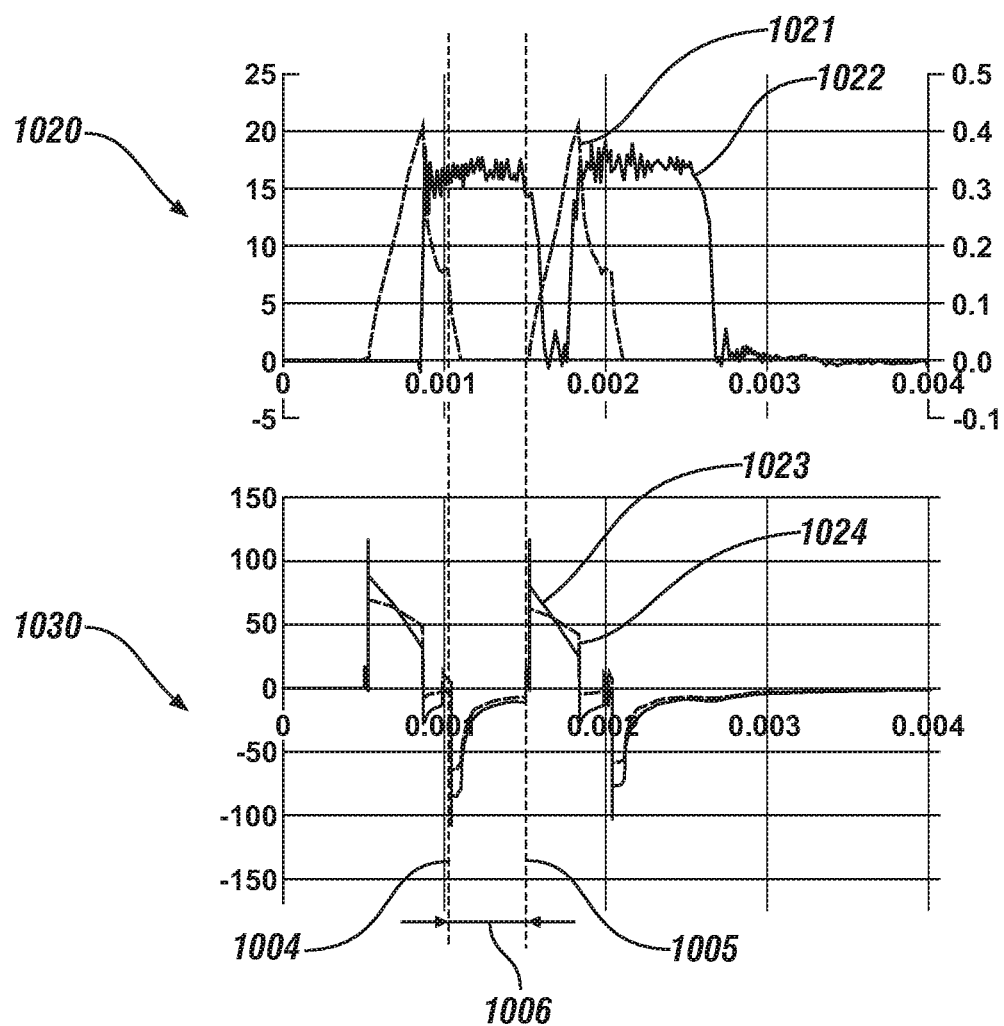
FIG. 3 illustrates a non-limiting exemplary first plot 1020 of measured current and fuel flow rate and a non-limiting exemplary second plot 1030 of measured main excitation coil and search coil voltages for two successive fuel injection events having identical current pulses that are separated by a dwell time that is indicative of being closely spaced, in accordance with the present disclosure.

FIG. 3 illustrates a non-limiting exemplary first plot 1020 of measured current and fuel flow rate and a non-limiting exemplary second plot 1030 of measured main excitation coil and search coil voltages for two successive fuel injection events having identical current pulses that are separated by a dwell time that is indicative of being closely spaced. The horizontal x-axis in each of plots 1020 and 1030 denotes time in seconds (s). Dashed vertical line 1004 extending through each of plots 1020 and 1030 represents a first time whereat an end of injection for the first fuel injection event occurs and dashed vertical line 1005 represents a second time whereat a start of injection for the second fuel injection event occurs. The dwell time 1006 represents a period of time between dashed vertical lines 1004 and 1005 separating the first and second fuel injection events. In the illustrated embodiment, the dwell time is less than a dwell time threshold. Thus, the first and second fuel injection events are indicative of being closely-spaced.

Referring to the first plot 1020, measured current and flow rate profiles 1021, 1022, respectively, are illustrated for the two fuel injection events. The vertical y-axis along the left side of plot 1020 denotes electrical current in Amperage (A) and the vertical y-axis along the right side of plot 1020 denotes fuel flow rate in milligrams (mg) per second (s). The measured current profile 1021 is substantially identical for each of the fuel injection events. However, the measured flow rate profile 1022 illustrates a variation in the measured fuel flow rate between each of the first and second fuel injection events even though the measured current profiles are substantially identical. This variance in the measured fuel flow rate is inherent in closely-spaced fuel injection events and undesirably results in an injected fuel mass delivered at the second fuel injection event that is different than an injected fuel mass delivered at the first fuel injection event.

Referring to the second plot 1030, measured main excitation coil and search coil voltage profiles 1023, 1024, respectively, are illustrated for the two fuel injection events. The measured main coil voltage may represent a measured voltage of the electrical coil 24 of FIG. 1 and the measured search coil voltage may represent a measured voltage of a search coil mutually magnetically coupled to the electrical coil 24 of FIG. 1. The vertical y-axis of plot 1030 denotes voltage (V). Accordingly, when the main excitation coil is energized, magnetic flux generated by the main excitation coil may be linked to the search coil due to the mutual magnetic coupling. The measured search coil voltage profile 1024 indicates the voltage induced in the search coil which is proportional to the rate of change of the mutual flux-linkage. The measured main excitation coil and search coil voltage profiles 1023, 1024, respectively, of plot 1030 differ during the second injection event in comparison to the first fuel injection event. This difference is indicative of the presence of residual flux or magnetic flux when the injection events are closely-spaced. Referring to plot 1010 of FIG. 2 the measured main excitation coil and search coil voltage profiles 1013, 1014, respectively do not differ during the second injection event in comparison to the first fuel injection event when the first and second fuel injection events are not closely-spaced.

Referring back to FIG. 1, exemplary embodiments are further directed toward providing feedback signal(s) 42 from the fuel injector 10 back to the control module 60 and/or the injector driver 50. Discussed in greater detail below, sensor devices may be integrated within the fuel injector 10 for measuring various fuel injector parameters for obtaining the flux linkage of the electrical coil 24, voltage of the electrical coil 24 and current provided to the electrical coil 24. A current sensor may be provided on a current flow path between the activation controller 80 and the fuel injector to measure the current provided to the electrical coil or the current sensor can be integrated within the fuel injector 10 on the current flow path. The fuel injector parameters provided via feedback signal(s) 42 may include the flux linkage, voltage and current directly measured by corresponding sensor devices integrated within the fuel injector 10. Additionally or alternatively, the fuel injector parameters may include proxies provided via feedback signal(s) 42 to—and used by—the control module 60 to estimate the flux linkage, magnetic flux, the voltage, and the current within the fuel injector 10. Having feedback of the flux linkage of the electrical coil 24, the voltage of the electrical coil 24 and current provided to the electrical coil 24, the control module 60 may advantageously modify the activation signal 75 to the fuel injector 10 for multiple consecutive injection events. It will be understood that conventional fuel injectors are controlled by open loop operation based solely upon a desired current waveform obtained from look-up tables without any information related to the force producing component of the flux linkage (e.g., magnetic flux) affecting movement of the armature portion 21. As a result, conventional feed-forward fuel injectors that only account for current flow for controlling the fuel injector, and are prone to instability in consecutive fuel injection events that are closely-spaced.

When the electrical coil 24 transitions from being energized to de-energized to activate opening and closing positions, respectively, of the fuel injector, variations of the magnetic field and magnetic flux within the fuel injector occur. Such variations induce circulating electrical current known as the aforementioned "eddy currents" within the fuel injector. As used herein, the terms "eddy current(s)" and "circulating eddy current" will be used interchangeably. The greater the magnitude of the magnetic flux generated by the energized electrical coil 24, the greater the magnitude of the circulating eddy current induced therefrom. Similarly, the faster the changes in the magnetic field and flux generated by the energized electrical coil 24 occur, the greater the magnitude of the circulating eddy current induced therefrom. It will be appreciated that eddy currents flow as closed loops in a direction perpendicular to the magnetic flux path they were induced by.

Moreover, the circulating eddy current has inductance, and thus, induces a corresponding secondary magnetic flux that opposes the magnetic flux generated by the electrical coil 24. Opposing the magnetic flux consequently decreases the electromagnetic force acting upon the armature portion 21. The greater the magnitude of the circulating eddy currents, the greater the magnitude of the secondary magnetic flux. This secondary magnetic flux further results in the undesirable residual flux after a fuel injection event, which slows a response time for the electromagnetic force acting upon the armature portion and impinges upon the magnetic flux generated by the electromagnetic assembly 24. When the response time for the electromagnetic force is slow, or otherwise impacted, deviations in magnitude of the electromagnetic force from a desired magnitude at a given time can result, having an impact on the position of the armature portion 21 during opening and closing of the fuel injector.

Figures 1, 4:
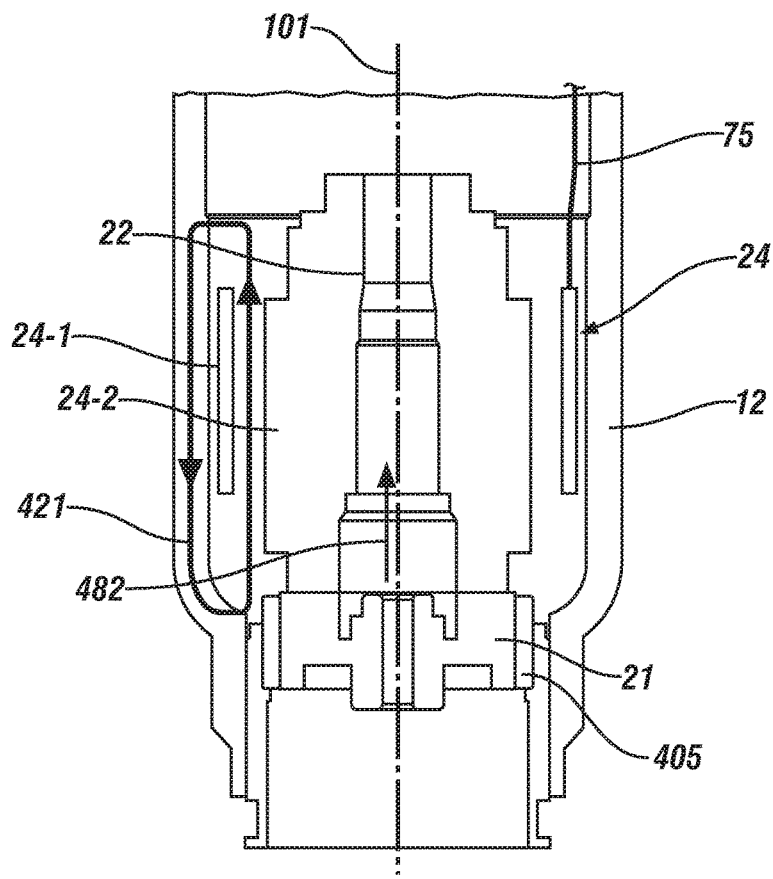
Figures 2, 4:
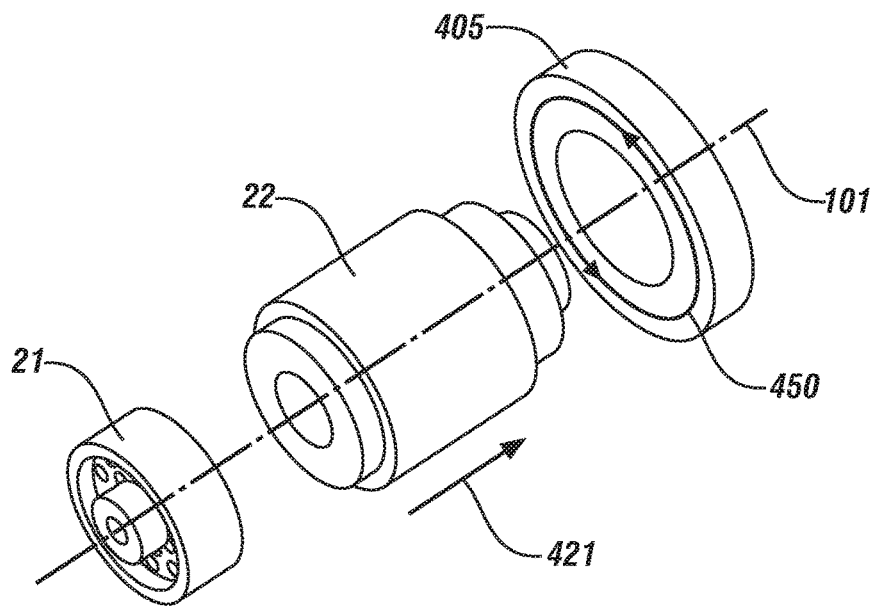

FIG. 4-1 illustrate a schematic sectional detailed view of a portion of the fuel injector of FIG. 1. As shown in FIG. 4-1 and described with reference to the fuel injector 10 of FIG. 1, the fuel injector 10 includes the body 12 defining the longitudinal axis 101, a guide ring 405 enclosing the armature portion 21, the pintle 22 and the electromagnetic assembly 24 that includes the electrical core 24-1 and the magnetic core 24-2. The longitudinal axis 101 and direction of armature displacement are generally aligned with the lines of flux through the center of the electrical core 24-1. This axis may also be referred to herein as the magnetic axis which may be referred to with respect to any magnetic component of the actuator. The guide ring 405, the armature portion 21, the pintle 22 and the electromagnet assembly 24 are concentric to the longitudinal axis 101. Each of the guide ring 405, the armature portion 21, the pintle 22, and the magnetic core 24-2 is an electrically conductive magnetic core component having an outer surface between axially opposite ends. As illustrated, each electrically conductive magnetic core component is annular and also include respective inner surfaces. Solid electrically conductive magnetic core components only have an outer surface. The electrical coil 24-1 is electrically operatively coupled to the injector driver 50 for receiving the aforementioned injector commands 75 that include selectively providing electrical current flow. A magnetic flux path 421 is generated when the electromagnet assembly 24 is energized by the electrical current. In the illustrated embodiment, the closed loop magnetic flux path 421 is only shown as flowing on one side of the longitudinal axis 101. However, it will be understood that the magnetic flux path extends radially with respect to the longitudinal axis 101. Therefore, another closed loop magnetic flux path symmetrical to the illustrated magnetic flux path 421 will be inferred on the other side of the longitudinal axis 101. A magnitude of the electromagnetic force 482 acting upon the armature 21 to urge the armature 21 in the second direction 82 is shown. Additionally, variations in the magnetic flux path 421 induce eddy currents that flow along conductive paths upon surfaces of components within the magnetic flux path 421. These conductive paths can be referred to as eddy current paths.

FIG. 4-2 illustrates a non-limiting exemplary embodiment of eddy current path(s) 450 induced upon surfaces of conductive components within the magnetic flux path 421 of the fuel injector 10 of FIG. 4-1. Specifically, the eddy current path(s) 450 are loops upon conductive surfaces, and flow in a direction perpendicular to the magnetic flux path 421 that is concentric to the longitudinal axis 101. In the illustrated embodiment, the conductive components within the magnetic flux path 421 include the guide ring 405, a pole piece of the pintle 22 (hereinafter "pintle 22"), and the armature portion 21. However, any component of the fuel injector 10 having conductance, and within the magnetic flux path 421, may exhibit eddy current paths flowing concentric to the longitudinal axis 101 in a direction perpendicular to the magnetic flux path 421. In the illustrated embodiment, the eddy current path(s) 450 are shown upon a surface of the guide ring 405; however, it will be appreciated that eddy current path(s) are similarly induced upon surfaces of the pintle 22 and the armature portion 21. As aforementioned, the presence of the eddy current path(s) 450 undesirably results in residual flux within the fuel injector after a fuel injection event and slows a response time for the electromagnetic force 482 acting upon the armature portion. Accordingly, the electromagnetic force 482 may deviate from a desired magnitude which may impact the opening and closing times of the fuel injector during fuel injection events.

Embodiments herein are directed toward reducing the presence of eddy current(s) within a solenoid-type magnetic structure. More specifically, embodiments herein will be directed toward increasing effective electrical resistivity in a conducting path within the solenoid-type magnetic structure followed by the eddy current(s). While the illustrated embodiments embody the solenoid-type magnetic structure within the fuel injector 10 of FIGS. 4-1 and 4-2; embodiments wherein the solenoid-type magnetic structure is embodied within other devices, such as, but not limited to, magnetorheological fluid dampers and control valves, are equally applicable.

FIGS. 5-1, 5-2 and 5-3 illustrate non-limiting exemplary embodiments of the conductive components of the fuel injector of FIGS. 4-1 and 4-2 having increased effective electrical resistivity in a direction of an eddy current path. In the non-limiting exemplary embodiments of FIGS. 5-1, 5-2 and 5-3, the conductive components of the fuel injector 10 include the armature 21, the pole piece of the pintle 22 and the guide ring 405. FIGS. 5-1, 5-2 and 5-3 will refer to the "pole piece of the pintle" simply as the "pintle".

Figures 1, 5:
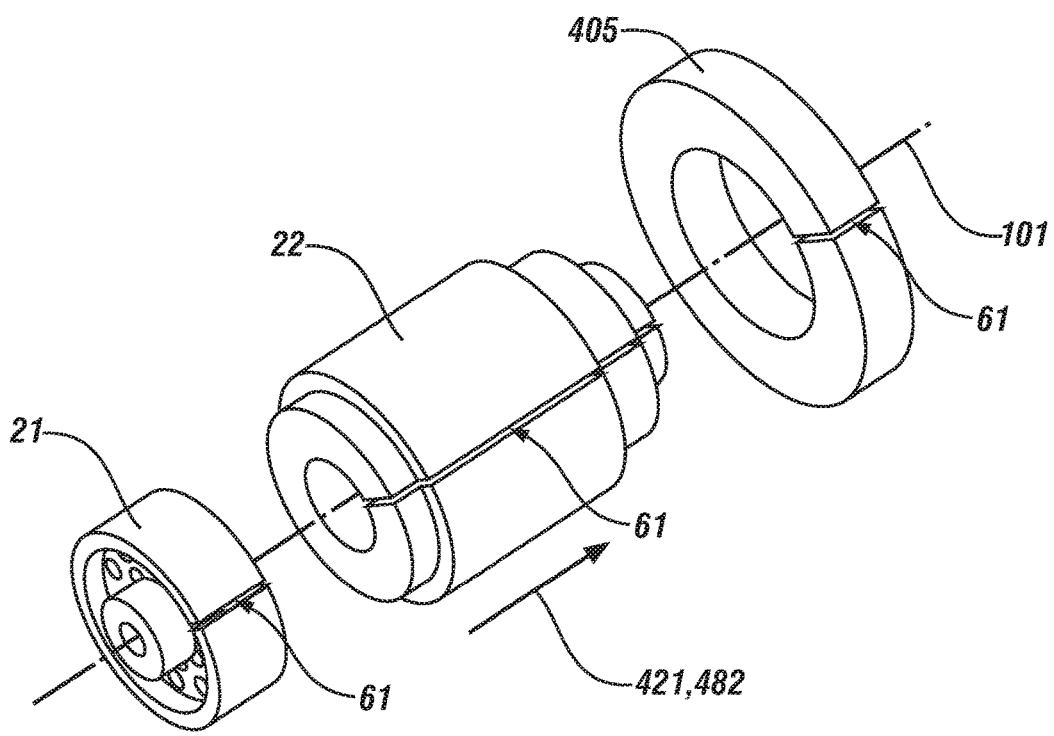
Figures 2, 5:
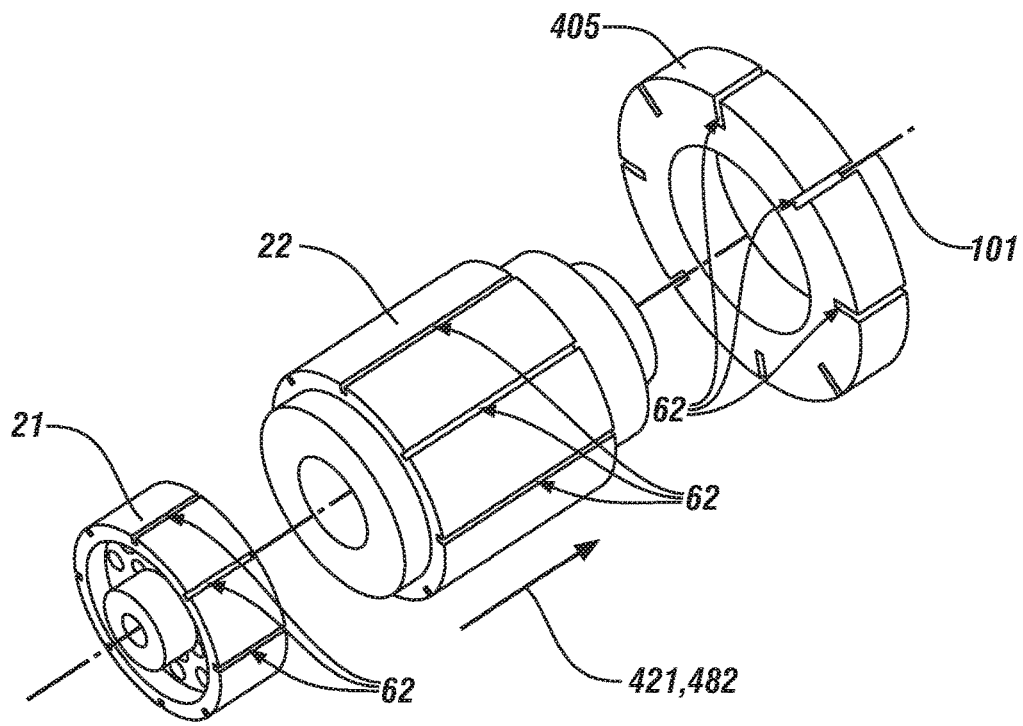
Figures 3, 5:
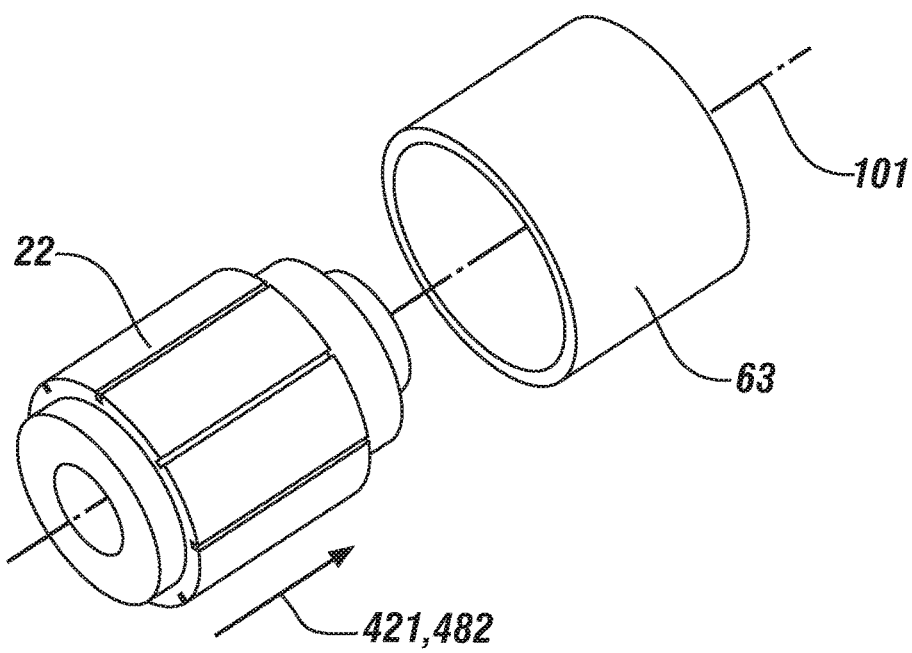

Referring to FIG. 5-1, each of the conductive components 21, 24-2 and 405 have an outer surface between axially opposite ends and include a corresponding slot 61 arranged between the axially opposite ends through the outer surface. Each slot 61 has a length extending in the same direction as the magnetic flux path, the electromagnetic force, and longitudinal axis 421, 482, and 101 respectively. In the illustrated embodiment, each slot 61 includes a depth radially extending entirely through each corresponding conductive component 21, 22 and 405, thereby establishing a complete continuity break. Reference to a slot is understood to correspond to a complete discontinuity in the magnetic material. A slot may also be referred to as a through slit, with the understanding that slit refers to partial discontinuity in the magnetic material. As aforementioned, induced eddy current paths flow in closed loops along conductive surfaces in a direction perpendicular to the electromagnetic force 421, 482, respectively, that is concentric to the longitudinal axis. Accordingly, the slots 61 effectively open a portion of the conductive path that the eddy current paths flow. Therefore, the effective electrical resistivity is increased in the direction along eddy current paths by utilizing the corresponding slots in a direction perpendicular to the conductive paths that the eddy current paths flow and in the same direction as the magnetic flux path and the electromagnetic force 421, 482, respectively.

Referring to FIG. 5-2, each of the conductive components 21, 22 and 405 include one or more corresponding slits 62 having lengths extending in the same direction as the magnetic flux path and the electromagnetic force 421, 482, respectively. In the illustrated embodiment, each slit 62 includes a depth radially extending through a portion of each corresponding conductive component 21, 22 and 405. Reference to slit is understood to correspond to a partial discontinuity in the magnetic material. Reference to a through slit is understood to correspond to a slot which has complete discontinuity in the magnetic material. The depth of each slit 62 can be uniform or the depth of each slit can be varied. Any number of slits 62 can be disposed radially around the inner or outer circumference surfaces of the components 21, 22 and 405. In one embodiment, the slits 62 are evenly spaced. In another embodiment, higher concentrations of slits 62 may be located in areas of the conducting components that are known to induce higher magnitudes of eddy currents. Accordingly, the slits 62 effectively disrupt segments of the conductive path that the eddy current paths flow by increasing electrical resistivity in the direction perpendicular to the magnetic flux path. Therefore, the effective electrical resistivity is increased in the direction that the Eddie Current paths flow which is in the direction perpendicular to the corresponding slits.

Referring to FIG. 5-4, each of the conductive components 21, 22 and 405 include one or more corresponding slits 64 having lengths arranged helically with respect to the magnetic flux path and the electromagnetic force 421, 482, respectively. In the illustrated embodiment, each slit 64 includes a depth radially extending through a portion of each corresponding conductive component 21, 22 and 405. The depth of each slit 64 can be uniform or the depth of each slit can be varied. Any number of slits 64 can be disposed radially around the inner or outer circumference surfaces of the components 21, 22 and 405. In one embodiment, the slits 64 are evenly spaced. In another embodiment, higher concentrations of slits 64 may be located in areas of the conducting components that are known to induce higher magnitudes of eddy currents. Accordingly, the slits 64 effectively disrupt segments of the conductive path that the eddy current paths flow by increasing electrical resistivity in the direction perpendicular to the magnetic flux path. Therefore, the effective electrical resistivity is increased in the direction that the Eddie Current paths flow.

Referring to FIG. 5-3, an electrically-resistive sleeve 63 is provided to encase the exterior surface of the conductive pole piece of the pintle 22. The exterior surface of the pintle 22 includes conductive paths for eddy currents to follow. The electrically-resistive sleeve 63 includes a low electrical conductivity or a high electrical resistivity. The electrically-resistive sleeve is composed of one or more high electrical resistive materials. Accordingly, the electrically-resistive sleeve 63 reduces conducting paths for eddy currents to flow. The illustrated embodiment is non-limiting, and electrically-resistive sleeves, or layers, can be provided to cover surfaces of other conductive components within the fuel injector that are exposed to eddy currents.

Figures 2A, 4:
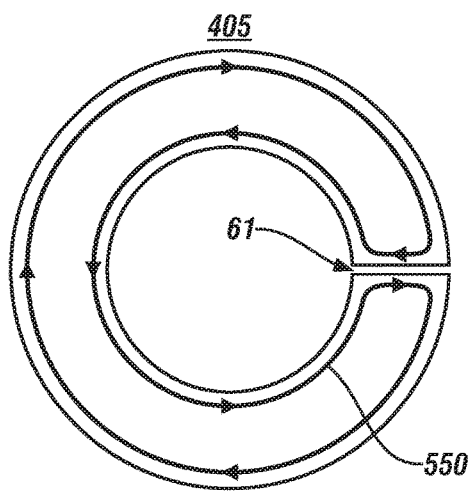
Figures 2B, 4:
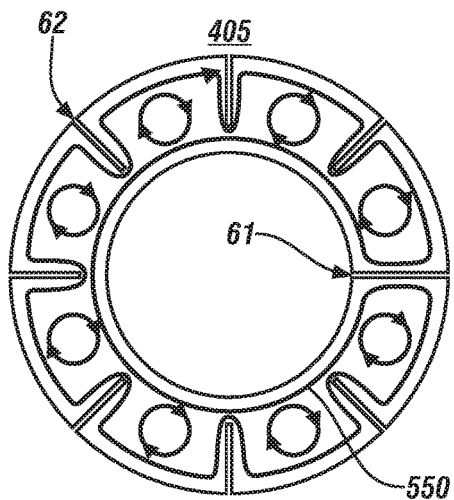
Figures 2C, 4:
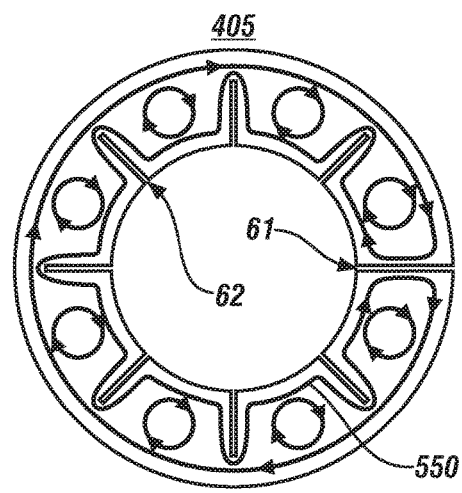
Figures 2D, 4:
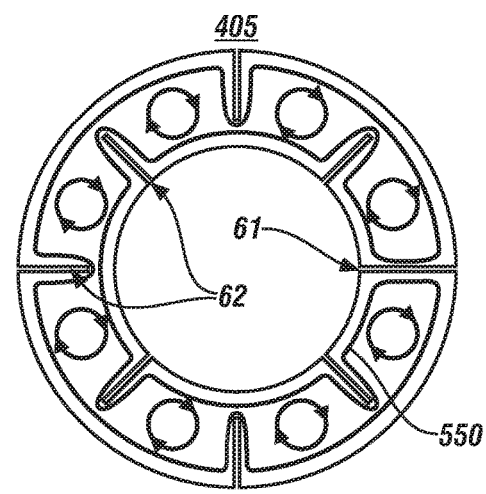

FIGS. 4-2A through 4-2D illustrate schematic end views of a variety of slit arrangements and combinations of slits on guide ring 405 taken along the axis 101 going into the page. While guide ring 405 is illustrated, the principles of the illustration is applicable to any annular components of magnetic material that are exposed to the magnetic flux path in the fuel injector or other electromagnetic actuator. Overlaid on each view are corresponding eddy current paths illustrative of the disruptive nature of each of the various slit arrangements.

FIG. 4-2A corresponds to a slot arrangement substantially as shown in FIG. 5-1. In this example, the annular component is completely annularly discontinuous by virtue of the slot 61. Eddy current paths 550 illustrate that the disrupted eddy current path no longer closes around the center of the annulus as would be the case in the absence of the slot 61.

FIG. 4-2B corresponds to a combined slot and slit arrangement. In this example, the annular component is completely annularly discontinuous by virtue of the slot 61. Additionally, a plurality of slits are arranged through the outer surface of the annulus. Eddy current paths 550 illustrate that the disrupted eddy current path no longer closes around the center of the annulus as would be the case in the absence of the slot 61. Moreover, the slits 62 further break up the total eddy current circulation into the smaller, compartmentalized regions defined between adjacent slits 62 and slot 61.

FIG. 4-2C also corresponds to a combined slot and slit arrangement. In this example, the annular component is completely annularly discontinuous by virtue of the slot 61. Additionally, a plurality of slits are arranged through the inner surface of the annulus. Eddy current paths 550 illustrate that the disrupted eddy current path no longer closes around the center of the annulus as would be the case in the absence of the slot 61. Moreover, the slits 62 further break up the total eddy current circulation into the smaller, compartmentalized regions defined between adjacent slits 62 and slot 61.

FIG. 4-2D also corresponds to a combined slot and slit arrangement. In this example, the annular component is completely annularly discontinuous by virtue of the slot 61. Additionally, a plurality of slits are arranged alternatively through the inner and outer surfaces of the annulus. Eddy current paths 550 illustrate that the disrupted eddy current path no longer closes around the center of the annulus as would be the case in the absence of the slot 61. Moreover, the slits 62 further break up the total eddy current circulation into the smaller, compartmentalized regions defined between adjacent slits 62 and slot 61.

The illustrated embodiments of FIGS. 5-1 through 5-3, and 4-2A through 4-2D are non-limiting, and can include increasing the effective electrical resistivity upon additional, or fewer, conductive components of the fuel injector. In one embodiment, conductive components may include a combination of a slot and one or more slits. It will be further understood that this disclosure is not limited to slits and slots to increase the effective electrical resistivity along conducting paths that eddy currents are known to follow. For instance, the conductive components can be composed of a portion of non-conductive material having a length extending in the same direction as the magnetic flux path and the electromagnetic force 421, 482, respectively, and perpendicular to conductive paths that eddy currents flow. Likewise, the conductive components can include a non-conductive film, or adhesive, having a length extending in the same direction as the magnetic flux path and the electromagnetic force 421, 482, respectively, and perpendicular to conductive paths eddy currents are known to follow. And, while the slits and slots have been illustrated substantially parallel with the axis 101 from one end of the magnetic component to the other, such slits and slots can alternatively be arranges helically from one end of the magnetic component to the other.

Figure 6:
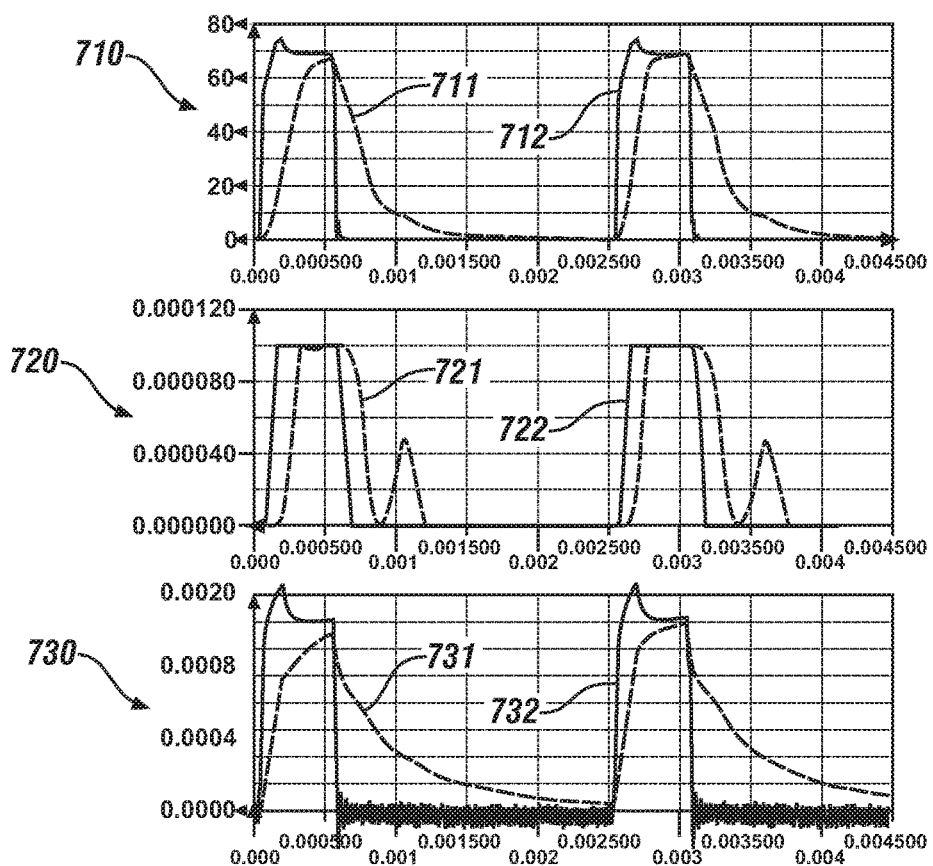
FIG. 6 illustrates non-limiting exemplary plots of experimental data representing response profiles for armature force, armature position and magnetic flux within a fuel injector for two successive fuel injection events, in accordance with the present disclosure.
Figures 4, 5:
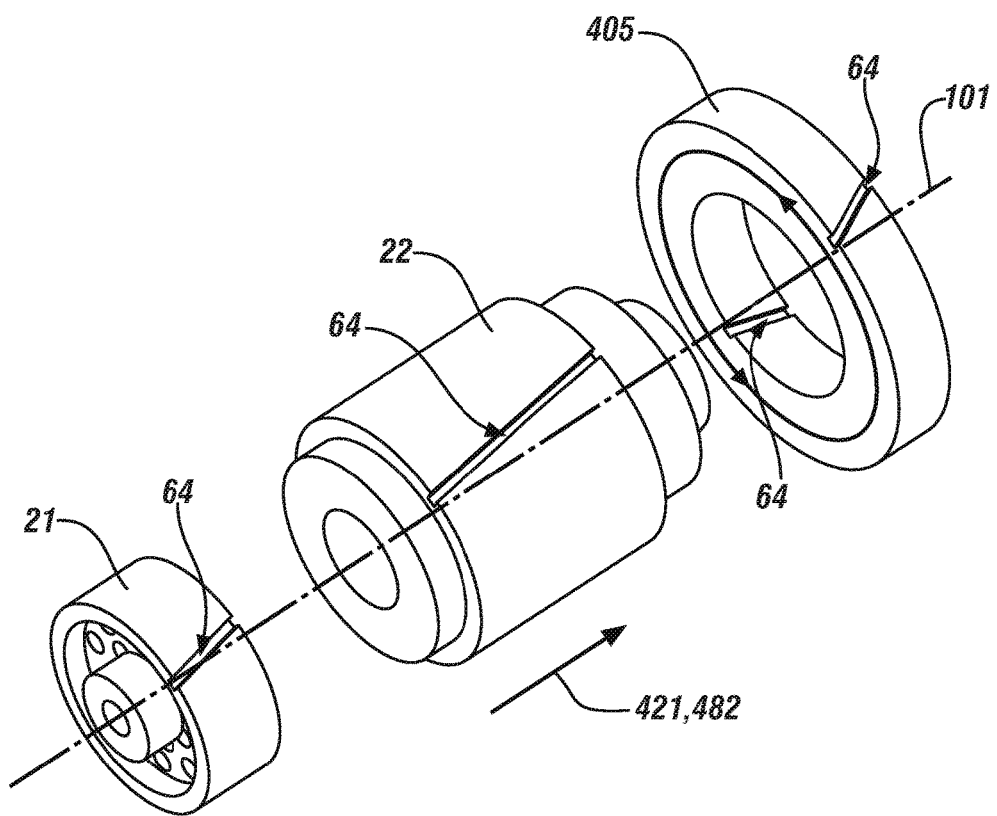

FIG. 6 illustrates non-limiting exemplary plots of experimental data representing response profiles for armature force, armature position and magnetic flux within a fuel injector for two successive fuel injection events. The horizontal x-axis in each of the plots denotes time in seconds and is zero at the origin. An electrical current to energize the fuel injector is commanded at 0 seconds for a duration of $5.0 \times 10^{-4}$ seconds to initiate the first fuel injection event. An electrical current to energize the fuel injector is commanded again at $2.5 \times 10^{-3}$ seconds for the same duration to initiate the second fuel injection event. The current commands for each of the fuel injection events indicate an identical measured current through the fuel injector having a waveform characterized by a peak pull-in current and a secondary hold current. The secondary hold current is released to zero a short delay after the current command duration has ended for each of the first and second fuel injection events at $5.0 \times 10^{-4}$ seconds and $3.0 \times 10^{-3}$ seconds, respectively.

Referring to plot 710, force profile 711 represents armature force in the presence of eddy currents within the fuel injector and force profile 712 represents the armature force not in the presence of eddy currents within the fuel injector. The force profiles 711 and 712 are responsive to current flow through the fuel injector. The vertical y-axis in plot 710 denotes armature force in Newtons (N) and is zero at the origin. Thus, when the armature force is zero, the measured current through the fuel injector is zero and the fuel injector is in a closed position because the armature is not exerting any force. As current flowing through the injector increases, the armature force will increase to activate the fuel injector in the open position. When the armature force achieves a threshold force, (e.g., 20 N) the fuel injector will begin to open. Likewise, the fuel injector will transition back to the closed position when the current flowing through the fuel injector is released and the armature force falls below the predetermined threshold.

As shown in the non-limiting plot 710, the force profile 711 in the presence of eddy currents has a slower response time in response to current flow than the armature force profile 712 not in the presence of eddy currents. Accordingly, increasing the effective electrical resistivity of conductive components within the fuel injector, as described above with reference to the non-limiting exemplary embodiments of FIGS. 5-1, 5-2 and 5-3, will result in the armature force responding quicker to transitions in current flow through the fuel injector.

Referring to plot 720, position profile 721 represents armature position in the presence of eddy currents within the fuel injector and position profile 722 represents armature position not in the presence of eddy currents within the fuel injector. The vertical y-axis in plot 720 denotes armature position in meters (m) and is zero at the origin. Thus, when the armature position is zero, no current is flowing through the fuel injector and the fuel injector is in a closed position. As the current flow increases to increase the armature force above the force threshold, the armature position will responsively increase from the origin in a direction to urge the fuel injector in the open position. Likewise, when the armature force falls below the force threshold when the current flow is released, the armature position will decrease back to zero in response thereto. As shown in the non-limiting plot 720, the position profile 721 in the presence of eddy currents has a slower response time than the position profile 722 not in the presence of eddy currents. Moreover, position profile 721 in the presence of eddy currents indicates a second smaller peak amplitude at $1.0 \times 10^{-3}$ and $3.75 \times 10^{-3}$ seconds each of the first and second fuel injection events, respectively, when the injector is closed. This second smaller peak amplitude, only present in position profile 721 in the presence of eddy currents, is indicative of undesirable armature bounce. Accordingly, increasing the effective electrical resistivity of conductive components within the fuel injector, as described above with reference to the non-limiting exemplary embodiments of FIGS. 5-1, 5-2 and 5-3, will result in the armature position having quick response times when current pulses flow through the fuel injector and will also substantially eliminate the undesirable occurrence of armature bounce that often occurs after fuel injection events in the presence of eddy currents.

Referring to plot 730, flux profile 731 represents magnetic flux in the presence of eddy currents within the fuel injector and flux profile 732 represents magnetic flux not in the presence of eddy currents within the fuel injector. The flux profiles 731 and 732 are responsive to current flow through the fuel injector. The vertical y-axis in plot 730 denotes magnetic flux in weber (Wb) and is zero at the origin. As current flow through the injector increases, the magnetic flux will also increase and is affective to generate the armature force. As shown in the non-limiting plot 730, the flux profile 731 in the presence of eddy currents has a slower response time than the flux profile 732 not in the presence of eddy currents. Moreover, flux profile 732 not in the presence of eddy currents achieves a higher magnitude of magnetic flux. Rather, flux profile 731 in the presence of eddy currents has a lower magnitude of magnetic flux due to the eddy currents generating secondary magnetic flux that opposes the flux profile 731. Accordingly, increasing the effective electrical resistivity of conductive components within the fuel injector, as described above with reference to the non-limiting exemplary embodiments of FIGS. 5-1, 5-2 and 5-3, will result in the magnetic flux having quick response times when current pulses flow through the fuel injector and will result in the magnetic flux not being impacted by secondary magnetic flux created by flowing eddy current.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A core structure for an electromagnetic actuator, comprising:
an electrically conductive magnetic core component having a magnetic axis, an outer surface between axially opposite ends and at least one slit arranged between said axially opposite ends through the outer surface, wherein said at least one slit is arranged helically to said magnetic axis.

2. A core structure for an electromagnetic actuator, comprising:
an annular electrically conductive magnetic core component having a magnetic axis, and inner and an outer surfaces between axially opposite ends, and at least one slit arranged between said axially opposite ends through at least one of the inner and outer surfaces, wherein said at least one slit is arranged helically to said magnetic axis.

3. The core structure of claim 2, wherein said at least one slit comprises a slot.

4. The core structure of claim 2, wherein said at least one slit comprises one slot and a plurality of slits.

5. The core structure of claim 2, further comprising at least one slit arranged between said axially opposite ends through the inner surface.

6. The core structure of claim 2, wherein said at least one slit is arranged parallel to said magnetic axis.

7. An electromagnetic fuel injector, comprising:
an annular electrically conductive magnetic core component having a magnetic axis, and inner and an outer surfaces between first and second axially opposite ends, and at least one slit arranged between said axially opposite ends through at least one of the inner and outer surfaces, wherein said annular electrically conductive magnetic core component comprises at least one of a guide ring, an armature, a pintle, and a magnetic core.

8. The electromagnetic fuel injector of claim 7 wherein said at least one slit comprises a slot.

9. The electromagnetic fuel injector of claim 7 wherein said at least one slit comprises one slot and a plurality of slits.

10. An electromagnetic fuel injector, comprising:
an annular electrically conductive magnetic core component having a magnetic axis, and inner and an outer surfaces between axially opposite ends, and at least one slit arranged between said axially opposite ends through at least one of the inner and outer surfaces, wherein said annular electrically conductive magnetic core component comprises at least one of a guide ring, an armature, a pintle, and a magnetic core.

11. The core structure of claim 10, wherein said at least one slit comprises a slot.

12. The core structure of claim 10, wherein said at least one slit comprises one slot and a plurality of slits.

13. The core structure of claim 10, wherein said at least one slit comprises a plurality of slits arranged on both the inner and outer surfaces of the core.

14. The core structure of claim 10, wherein said at least one slit is arranged parallel to said magnetic axis.

* * * * *